United States Patent [19]

Wood et al.

[11] 4,411,319
[45] Oct. 25, 1983

[54] SENSITIVITY ADJUSTING APPARATUS FOR TRACTOR DRAFT SENSING AND CONTROL SYSTEM

[75] Inventors: Dale A. Wood, Canton; Lee E. Elfes, Bloomfield Hills, both of Mich.

[73] Assignee: Massey-Ferguson Inc., Detroit, Mich.

[21] Appl. No.: 930,486

[22] Filed: Aug. 2, 1978

[51] Int. Cl.² ......................................... A01B 63/112
[52] U.S. Cl. ........................................................ 172/10
[58] Field of Search ........................... 172/7, 8, 9, 10; 280/446 A

[56] References Cited

U.S. PATENT DOCUMENTS

| | | | |
|---|---|---|---|
| 2,715,863 | 8/1955 | Bunting | 172/9 |
| 2,721,508 | 10/1955 | Edman | 172/9 |
| 2,721,509 | 10/1955 | Klemm et al. | 172/10 |
| 2,786,402 | 3/1957 | Senkowski et al. | 172/9 |
| 2,790,364 | 4/1957 | Bunting | 172/10 |
| 2,864,295 | 12/1958 | DuShane | 172/9 |
| 2,921,638 | 1/1960 | DuShane | 172/9 |
| 3,294,179 | 12/1966 | Bunting et al. | 172/10 |
| 3,409,087 | 11/1968 | Schneider | 172/7 |
| 3,888,315 | 6/1975 | Elfes et al. | 172/7 |
| 3,917,002 | 11/1975 | Mueller, Jr. | 172/9 |

Primary Examiner—Richard T. Stouffer
Attorney, Agent, or Firm—John C. Thompson

[57] ABSTRACT

An apparatus for varying the sensitivity of a tractor draft sensing and control system of the type including a draft sensing mechanism having an output link shiftable along its length in response to changes in draft and a draft control linkage having an input arm mounted for swinging movement about a pivot. The input arm is provided with a generally radially extending slot, and the output link is provided with structure slideably received within the slot. A control member, which is adjusted by a screw rod, selectively positions the structure within the slot to vary the moment arm of the input arm which, in turn, varies the sensitivity of the system.

12 Claims, 3 Drawing Figures

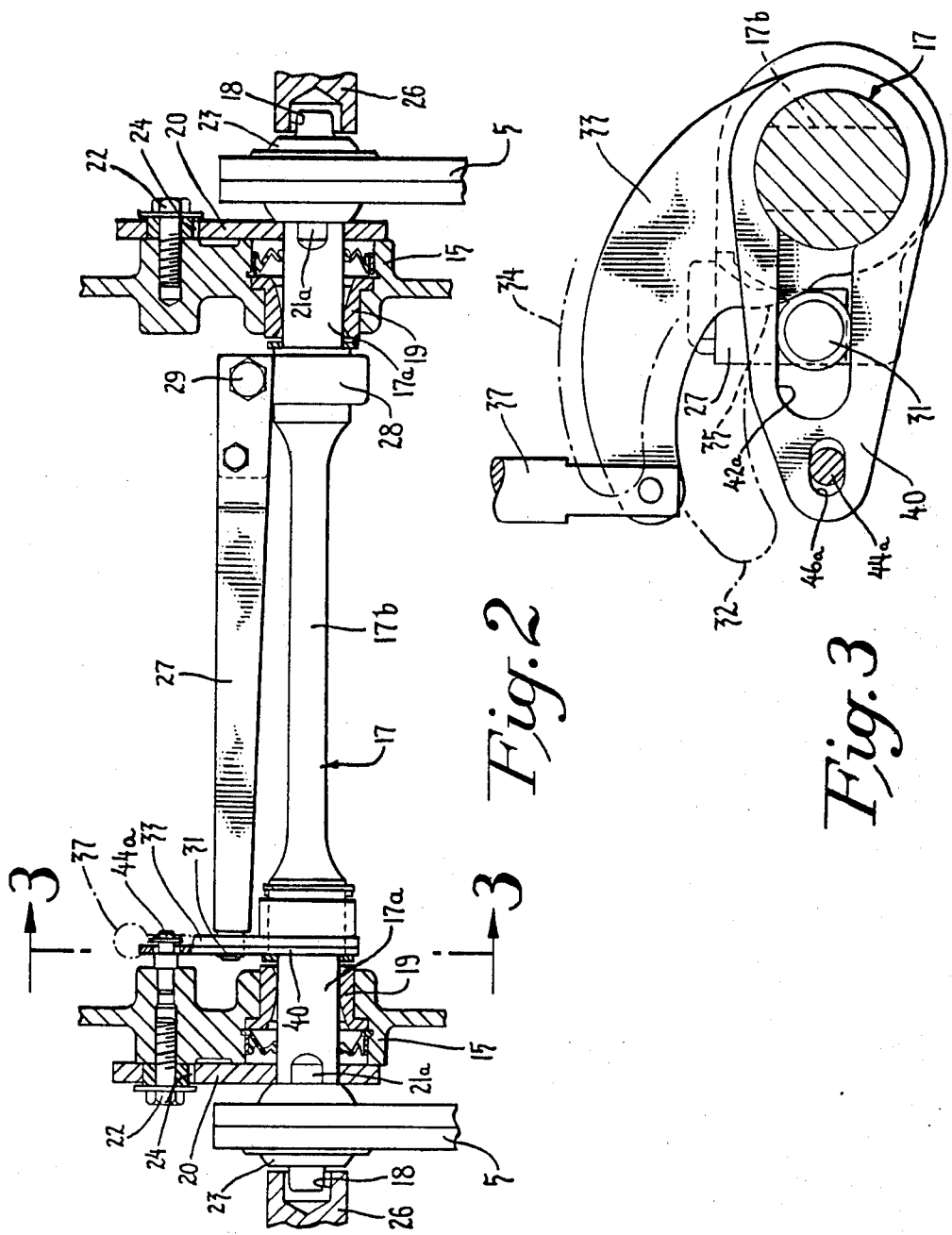

SENSITIVITY ADJUSTING APPARATUS FOR TRACTOR DRAFT SENSING AND CONTROL SYSTEM

TECHNICAL FIELD

The present application relates particularly to tractor draft control systems and more particularly to an apparatus for varying the sensitivity of such a system.

PRIOR ART

It may be desirable to vary the sensitivity of a draft control system in order to make the system properly responsive to various draft loads as is well known from prior U.S. patents such as U.S. Pat. No. 2,715,863 issued Aug. 23, 1955, U.S. Pat. No. 2,721,509 issued Oct. 25, 1955, U.S. Pat. No. 2,786,402 issued Mar. 26, 1957, U.S. Pat. No. 2,790,364 issued Apr. 30, 1957 and U.S. Pat. No. 3,294,179 issued Dec. 27, 1966. Thus, a tractor working with heavy draft loads would require a less sensitive system than one working with light draft loads.

DISCLOSURE OF INVENTION

It is an object of the present invention to provide an apparatus for adjusting the sensitivity of a tractor draft sensing and control system of the type shown in U.S. Pat. No. 3,888,315 issued June 10, 1975 and U.S. Pat. No. 3,917,002 issued Nov. 4, 1975 wherein the output signal or draft feedback signal of the draft sensing mechanism shown in U.S. Pat. No. 3,888,315 can be infinitely varied over a range by the operator of a tractor. To this end, the input arm 69 of the draft control linkage shown in U.S. Pat. No. 3,917,002 is provided with an elongated slot which receives a transversely extending element carried by the upper end of the output link 37, and additional structure is provided for controlling the position of the transversely extending element within the slot. This additional structure in a preferred form includes a threaded rod one end of which passes through the tractor housing, said one end being provided with a knob which may be engaged by the tractor operator. The other end of the threaded rod engages a spring biased member which is also provided with a slot that receives the transversely extending element carried by the upper end of the link.

BRIEF DESCRIPTION OF THE DRAWINGS

FIG. 2 is a generally cross-sectional view, taken along a horizontal plane showing a draft sensing unit and the mounting therefore.

FIG. 3 is an enlarged sectional view taken along the line 3—3 in FIG. 2.

DETAILED DESCRIPTION

Figure 1:
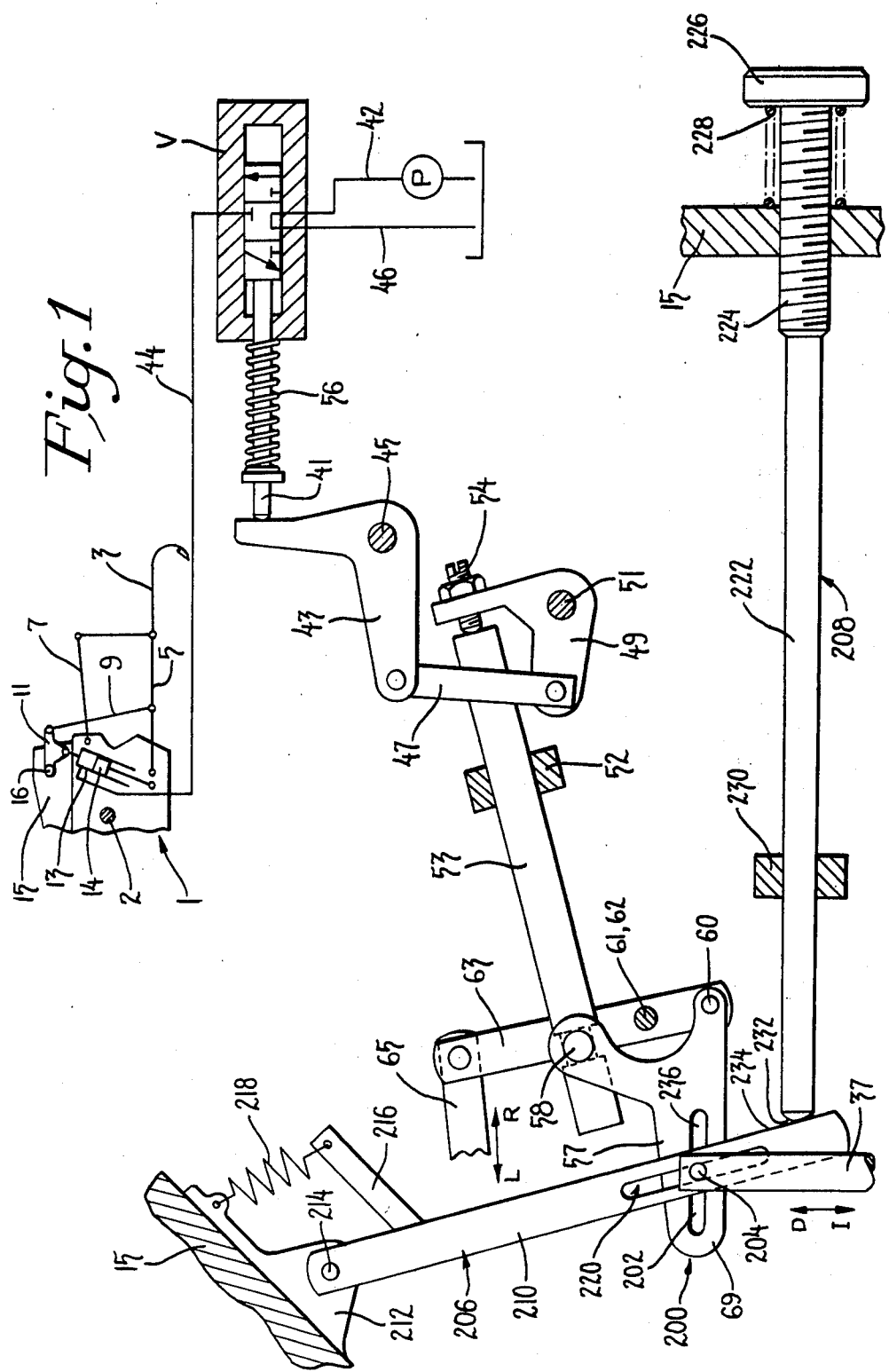
FIG. 1 illustrates how the sensitivity adjustment mechanism of this invention may be applied to a tractor draft control and sensing mechanism.

In the following description the same reference numerals will be employed for the same parts illustrated in U.S. Pat. Nos. 3,888,315 and 3,917,002, the disclosure which patents is incorporated herein by reference thereto. It should be appreciated that in FIG. 1 of this application various parts which are not essential to an understanding of this invention have been eliminated, and the relative position of some elements have been changed. Referring now more specifically to FIG. 1, a portion of a farm tractor 1 is illustrated. The tractor is supported on a rear axle 2 and has a conventional three-point hitch to which an implement 3 is secured. The three-point hitch includes a pair of lower draft links 5 and an upper link 7, only the left hand draft link 5 and parts associated with it being shown. The lower ends of lift links 9 are connected to the draft links 5 and the upper ends of the lift links are connected to one end of rock arms 11, the other end of the rock arms being rigidly secured to a rock shaft 16 supported by the tractor for rotational movement. A tractor housing includes various castings rigidly interconnected to each other, the housing being collectively referred to by reference numeral 15. The rod ends of cylinder assemblies 13,14 are connected to the housing 15 and the other ends are connected to an intermediate portion of the rock arms 11. It can be seen that by extending the cylinder assemblies 13,14 that the implement hitch will be raised, and conversely by retracting the cylinder assemblies that the implement hitch will be lowered.

In FIG. 2, the lower links 5 are shown supported on the ends of a shaft 17 which is, in turn, supported by fulcrum supports in the form of bearings 19 within a housing 15. Shaft 17 has cylindrical portions 17a, an intermediate portion 17b of smaller diameter in the horizontal plane than the vertical plane and reduced end portions which receive ball joints 23 on the lower links 5. The end portions of the shaft 17 are loosely received within depressions 18 which are in the end of the short stub shaft 26. The reduced end portions can move freely therein within limits.

A pair of plates 20 are carried on the shaft 17 and are attached by bolts 22 to the housing 15. The plates are non-rotatably attached to the shaft 17 as by splines or flats 21a. This prevents rotation of the shaft 17. The bolts pass through slots 24 in the plates and the slots permit fore and aft movement of the shaft due to the draft forces. As seen in FIG. 2, the end portions are free to move within a limited range in the depressions 18 in the ends of the short stub shafts 26. Maximum bending of the shaft 17 in either direction will cause the end portions to engage the sides of the holes in short stub shafts 26 to act as a stop limiting further bending of the shaft 17.

An elongated flat member 27 is affixed by a clamp 28 to the right end portion 17a FIG. 2 of the shaft 17. A bolt 29 acts to tighten the clamp on the shaft. As taught in U.S. Pat. No. 3,812,916, the member 27 is clamped to the shaft 17 at or near a point of maximum angular deflection. The opposite end of the elongated member 27 carries a roller 31 that engages a cam or cam member 33 rotatably carried on the left end portion of the shaft 17. As seen in FIG. 3, the cam or cam member 33 has a cam surface 35 engaged by the roller 31 to cause the cam member 33 to be rotated about its axis coincident with the axis of the shaft 17. The cam member 33 is pivotally connected at its outer end to the lower end of a link rod 37 which transmits motion of the cam member 33 to the control mechanism illustrated in FIG. 1. A spring 56 acts between a stationary portion on the tractor and the link rod 37 to urge it downwardly and thereby cause the cam member 33 to bear against the roller 31.

As seen in FIG. 3 an elongated arm 40 is mounted on the shaft 17. The arm has a slot 42a into which the roller 31 on the end of elongated member 27 extends. The slot permits fore and aft movement of the roller and elongated member 27 relative to the cylindrical shaft 17 but prevents relative vertical movement therebetween. Rotation of elongated member 27 and elongated arm 40 about the shaft axis is prevented by a pin 44a extending from a hole in the housing 15 into a second horizontal slot 46a formed in the arm 40. The slot permits horizontal movement of the shaft 17 relative to the housing 15 but prevents both vertical movement and rotational movement of the elongated member 27 and attached shaft 17 relative to the housing. The motion control means includes the arm 40, slot 46a and pin 44a.

The operation of the foregoing structure and additional details are more fully described in U.S. Pat. No. 3,888,315.

A pump P is mounted within the housing 15 and is operatively interconnected with a valve V through fluid line 42. The valve V which is mounted within the housing 15, can be considered to be a three position spool valve and in the centered position illustrated in the drawing the fluid from the pump will be discharged back to the reservoir through line 46. In another position of the valve the hydraulic fluid from the pump will be introduced into cylinders 13 through fluid lines 44. In yet another position of the valve the fluid will be discharged from the cylinders 13 through lines 44 and 46.

A plunger shaft 41 is interconnected with the valve spool and is normally biased in one direction by a spring 56. The spring 56 will maintain the plunger shaft 41 in contact with one arm of a bell crank 43 mounted about a pivot shaft 45. The other arm of the bell crank 43 is interconnected to a second bell crank 49 by a link 47, the second bell crank 49 being mounted about a pivot shaft 51. In actual practice the pivot shaft 51 extends transversely of the tractor while the pivot shaft 45 extends in a fore and aft direction. The other arm of the bell crank 49 is provided with an adjusting mechanism or screw 54 which permits the operator's control lever (not shown) to be positioned in accordance with the position of the valve.

A control rod 53 is supported by a trunnion 58 and a bracket 52 which is part of the housing 15, one end of the control rod 53 being engaged by the adjusting screw 54. The trunnion 58 is supported by an operating lever 57 which is in turn pivoted about pivot shaft 60. The pivot shaft 60 is carried by a link 63 which is in turn pivoted about pivot shaft 61,62. The upper end of the link 63 is in turn connected with a further link 65 which is connected with the operator's control lever. The operating lever 57 is interconnected with the input arm 69, the input arm 69 in turn being connected to the output link 37 of a draft sensing apparatus.

As the foregoing structure is more fully illustrated in the prior art it will not be fully described herein. However, it should be briefly noted that if the link 65 is moved in the direction indicated by the reference letter L a "lower" command signal will be transmitted to the valve V as link 63 pivots about shaft 61,62 causing the trunnion 58 to shift the control rod 53 in a rearward direction thus compressing spring 56 and shifting the valve spool to the right permitting fluid to be discharged from the cylinder 13. Movement of the link 65 in the direction indicated by letter R will initiate a "raise" command signal causing the linkage to be raised. Draft feedback signals are transmitted into the draft control linkage through the output link 37 of the draft sensing apparatus. If the link 37 were to move in the direction of the arrow indicated by I this would indicate that the draft was increasing. It would then be desirable to raise the implement 3 and to this end the arm 69 and lever 57 would be swung in a counterclockwise direction about the pivot 60 thus permitting the valve spool to shift to the left under the action of the spring 56 permitting fluid to be introduced into the cylinder 13 to raise the implement 3. If the draft were decreasing the link would be shifted in an upward direction D which would then initiate a movement of the valve spool to cause the implement 3 to be lowered.

The sensitivity adjusting apparatus of this invention is indicated generally at 200 and includes a guide surface 202 formed on the input arm 69, the guide surface being contacted by a transversely extending member 204 carried by the upper end of the link 37. The sensitivity adjusting apparatus further includes a control member 206 and adjusting means 208. In the embodiment illustrated in the guide surface 202 is a slot, however, the guide surface could be formed on the lower end of the input arm 69 as the lower surface will normally be biased into contact with a transversely extending member 204 by the action of spring 56. The transversely extending member 204 is in the form of a pin which is rigidly secured to the upper end of the link 37. The control member 206 in the embodiment illustrated is a link 210 which is pivotally secured to a lug 212 on the housing 15 by means of a pivot 214. The link 210 carries an upwardly and rearwardly extending arm 216 which is in turn engaged by one end of a tension spring 218, the other end of the tension spring engaging a suitable aperture in the lug 212. It can be seen that the spring 218 acting through arm 216 will bias the lower portion of link 210 in a rearward direction. The lower portion of the link 210 is provided with an elongated slot 220 and the transversely extending pin 204 passes through the slot 220.

The adjusting means 208 is in the form of a rod 222 threaded at one end 224, the threaded end 224 passing through a suitable threaded aperture in the housing 15. A control knob 226 is mounted on the end of the rod 222 outside of the housing, the control knob 226 being held in various positions of rotational adjustment by a spring device 228. An intermediate portion of the control rod 222 passes through a support 230 integral with the housing 15. The forward end of the rod 222 is provided with a bearing surface 232 which is adapted to bear against the rear face 234 of the link 210.

The ends 235 and 236 of the slot 202 are spaced varying distances away from the pivot 60. It can be seen that incremental movements of the link 37 will cause differing movements of the trunnion 58 for differing positions of the pin 204 in slot 202. Thus, when the pin 204 is disposed in the left hand end 234 of the slot 202 a movement of one unit of the link 37 will cause about one-half the corresponding movement of the trunnion 58 as compared to that movement caused when the transversely extending pin is disposed in the right hand end 236 of the slot 202.

The operator may vary the sensitivity of the system by merely rotating the knob 226. Thus, when working with heavy draft implements the knob 226 would be rotated in such a direction to project the rod 222 in a forward direction to thereby reduce the sensitivity of the system. If the operator were working with light draft implements the rod would be retracted to position the pin 204 in the rearward end 236 of the slot 202 thereby increasing the sensitivity of the system.

While the design set forth above has the advantage in that the operator can adjust the sensitivity of the system throughout a range without the use of tools, it may be desirable from a cost standpoint to simplify the foregoing structure. Thus, one simplified structure would involve providing the input arm 69 with a plurality of apertures which are spaced varying radial distances from the pivot 60, and connecting the link 37 through the pin 204 to any one of the apertures in accordance with the desired sensitivity of the draft control system. Thus, if only two apertures were provided, these apertures being disposed at the location of the ends 234 and 236 of the slot 202, the operator would dispose the pin in the aperture closest to the pivot when the greater sensitivity of the system were desired, and in that aperture spaced furthest from the pivot when the least sensitivity were desired.

What is claimed is:

1. A senstivity adjusting apparatus for adjusting the sensitivity of a tractor draft sensing and control system provided with a draft sensing mechanism and a draft control linkage, the draft sensing mechanism including a tractor housing (15) having spaced apart fulcrum supports, an elongated bendable shaft (17) mounted in the spaced apart fulcrum supports, draft members (5) connected to said shaft at points spaced outwardly of said tractor housing and operable to cause said shaft to bend when transmitting forces to said shaft, an elongated sensing arm assembly (27, 28) having a free end (31) and another end which is mounted on said elongated bendable shaft, and means to measure the movement of said free end, said measuring means including an output link (37) shiftable along its length in response to changes in draft; the draft control linkage having an input arm (69) mounted for movement about a pivot (60); wherein the improvement comprises:

interconnecting structure on an upper end portion of said output link (37); and spaced apart connection locations (234, 236) on said input arm to which said interconnecting structure may be connected to vary the sensitivity of the draft control system.

2. The sensitivity adjusting apparatus as set forth in claim 1 in which said spaced apart locations are defined by a radially extending slot (202).

3. The sensitivity adjusting apparatus set forth in claim 1 in which said interconnecting structure is a transversely extending member (204) carried by said link (37).

4. A sensitivity adjusting apparatus for adjusting the sensitivity of a tractor draft sensing and control system provided with a draft sensing mechanism having an output link (37) shiftable along its length in response to changes in draft and a draft control linkage having an input arm (69) mounted for movement about a pivot (60); wherein the improvement comprises;

a guide surface (202) on the input arm (69) of the draft control linkage, opposed ends (234, 236) of the guide surface (202) being differing distances from said pivot (60);

a transversely extending member (204) carried by said link (37), said member engaging said guide surface (202);

a control member (206) interconnected with said transversely extending member; and adjusting means (208) operable to selectively position said control member (206) whereby the sensitivity of the draft sensing control system may be varied.

5. The sensitivity adjusting apparatus set forth in claim 4 wherein said guide surface is a slot (202).

6. The sensitivity adjusting apparatus set forth in claim 4 wherein said transversely extending member is a pin (204).

7. The sensitivity adjusting apparatus set forth in claim 4 wherein said control member (206) is provided with a slot (220) which receives the transversely extending member (204).

8. The sensitivity adjusting apparatus set forth in claim 7 wherein said control member is a link (210) pivoted at one end, said slot being disposed in a portion from said end.

9. The sensitivity adjusting apparatus as set forth in claim 8 wherein said link (210) is spring biased in one direction into engagement with said adjusting means, and wherein said adjusting means includes an element (222) shiftable towards or away from said link.

10. The sensitivity adjusting apparatus as set forth in claim 4 wherein said control member is a pivoted link (210) spring biased into engagement with said adjusting means.

11. The sensitivity adjusting apparatus as set forth in claim 4 wherein said adjusting means is a threaded rod (222,224) interconnected with said control member (206) in such a manner so that as the threaded rod is rotated it will shift the control member and said transversely extending member (204) in such a manner that the sensitivity will be varied.

12. The sensitivity adjusting apparatus as set forth in claim 11 wherein said threaded rod passes through a threaded aperture in a tractor housing (15), said threaded rod being provided with a control knob (226) outside of said housing.

* * * * *